(12) United States Patent
Chao (10) Patent No.: US 11,525,966 B2
(45) Date of Patent: Dec. 13, 2022

(54) OPTICAL COUPLING APPARATUS

(71) Applicant: NINGBO QUNXIN MICRO-ELECTRONICS CO., LTD, Zhejiang (CN)

(72) Inventor: Yang Chao, Zhejiang (CN)

(73) Assignee: NINGBO QUNXIN MICRO-ELECTRONICS CO., LTD, Zhejiang (CN)

( * ) Notice: Subject to any disclaimer, the term of this patent is extended or adjusted under 35 U.S.C. 154(b) by 134 days.

(21) Appl. No.: 17/081,037

(22) Filed: Oct. 27, 2020

(65) Prior Publication Data

US 2021/0405305 A1 Dec. 30, 2021

(30) Foreign Application Priority Data

Jun. 30, 2020 (CN) .......................... 202010616266.4

(51) Int. Cl.
*G02B 6/42* (2006.01)
*H04B 10/25* (2013.01)
*H04B 10/27* (2013.01)

(52) U.S. Cl.
CPC ........... *G02B 6/4202* (2013.01); *H04B 10/25* (2013.01); *H04B 10/27* (2013.01)

(58) Field of Classification Search
CPC ....... G02B 6/4202; H04B 10/25; H04B 10/27
See application file for complete search history.

(56) References Cited

U.S. PATENT DOCUMENTS

| 5,578,828 A * | 11/1996 | Brown | ................... G01N 21/72 |
| | | | 340/513 |
| 6,271,528 B1 * | 8/2001 | Struye | ..................... G01J 1/429 |
| | | | 250/484.5 |

(Continued)

FOREIGN PATENT DOCUMENTS

| CN | 1333882 A | 1/2002 |
| CN | 1406404 A | 3/2003 |

(Continued)

OTHER PUBLICATIONS

The First Office Action issued in corresponding Chinese Patent Application No. CN202010616266 dated Feb. 7, 2021.

(Continued)

*Primary Examiner* — Georgia Y Epps
*Assistant Examiner* — Don J Williams
(74) *Attorney, Agent, or Firm* — Norton Rose Fulbright US LLP (57) ABSTRACT

An optical coupling apparatus is disclosed, including: a monochromatic light source configured to emit monochromatic light; a monochromatic light photodetector configured to receive the monochromatic light; and a monochromatic light transmission medium, wherein at least a portion of the monochromatic light transmission medium is disposed between the monochromatic light source and the monochromatic light photodetector, and the monochromatic light is transmitted to the monochromatic light photodetector via the monochromatic light transmission medium, wherein a wavelength of the monochromatic light is shorter than a wavelength of infrared light. Embodiments of the present disclosure provide an optical coupling apparatus with a higher upper limit of operating frequency, which may better meet user requirements.

12 Claims, 3 Drawing Sheets

(56) References Cited

U.S. PATENT DOCUMENTS

| | | |
|---|---|---|
| 7,039,322 B1 | 5/2006 | Yoshimura et al. |
| 2003/0133479 A1 | 7/2003 | Morikawa et al. |
| 2004/0026756 A1 | 2/2004 | Yoshida et al. |
| 2007/0146132 A1* | 6/2007 | Krug ............... G08B 13/187 340/553 |
| 2007/0194339 A1 | 8/2007 | Horio |
| 2007/0241343 A1 | 10/2007 | Yamazaki et al. |
| 2012/0201493 A1 | 8/2012 | Choi |
| 2013/0182444 A1 | 7/2013 | Østergaard Wagenblast Stubb et al. |
| 2017/0047462 A1 | 2/2017 | Ishigaki |
| 2017/0099474 A1* | 4/2017 | Shen ............... H01L 27/14685 |
| 2020/0333245 A1* | 10/2020 | Mohseni ............... A61B 5/0066 |

FOREIGN PATENT DOCUMENTS

| | | |
|---|---|---|
| CN | 102656493 A | 9/2012 |
| CN | 102844896 A | 12/2012 |
| JP | H05327004 | 12/1993 |
| JP | H08116309 A | 5/1996 |
| JP | H10284755 | 10/1998 |
| JP | 2003101063 | 4/2003 |
| JP | 2005191189 | 7/2005 |
| JP | 2007258399 | 10/2007 |
| JP | 2011096833 | 5/2011 |
| JP | 2012256683 | 12/2012 |
| JP | 2013098381 | 5/2013 |
| JP | 2015029037 | 2/2015 |
| JP | 2019100963 | 6/2019 |
| KR | 20150066148 | 6/2015 |
| TW | M491827 | 12/2014 |
| TW | I521897 B | 2/2016 |
| WO | WO 2017/013827 | 1/2017 |

OTHER PUBLICATIONS

Extended European Search Report issued in corresponding Application No. 20202079.8 dated Apr. 6, 2021.

El Amrani et al., "Organic optocoupler consisting of an optimized blue organic light emitting diode and an organic photoconductor", *Superlattices and Microstructures*, 85:880-885, 2015.

Zhang et al., "High-Performance Photocoupler Based on Perovskite Light Emitting Diode and Photodetector", *ACS Appl. Mater. Interfaces*, 10:39441-39447, 2018.

The 1st Office Action issued in corresponding Taiwanese Patent Application No. TW109133937 dated Mar. 11, 2021.

Office Action issued in Corresponding Japanese Application No. 2020-180642, dated Oct. 26, 2021 (English Translation provided).

* cited by examiner

OPTICAL COUPLING APPARATUS

CROSS-REFERENCE TO RELATED APPLICATIONS

This application claims the benefit of priority to Chinese Patent Application No. 202010616266.4, filed on Jun. 30, 2020, and entitled "OPTICAL COUPLING APPARATUS", the entire disclosure of which is incorporated herein by reference.

TECHNICAL FIELD

The present disclosure generally relates to optoelectronic technology field, and more particularly, to an optical coupling apparatus.

BACKGROUND

An optical coupling apparatus uses light as a carrier to transmit electrical signals. As having a good isolation effect on input and output electrical signals, it is widely used in various circuits, and has become one of the most diversified and multi-purpose optical apparatuses.

An existing optical coupling apparatus is generally consisting of three parts including a light source for emitting light, a light transmission medium, a light receiving and signal amplifying component. An input electrical signal is converted into an optical signal by making the light source emit light of a certain wavelength which is then received by a photodetector to generate a photocurrent, and the photocurrent is further amplified and output, thereby completing an electrical-optical-electrical conversion and providing a function of input, output and isolation. As the input and output of the optical coupling apparatus are isolated from each other, and electrical signal transmission is unidirectional, the optical coupling apparatus always possesses good electrical insulation ability and anti-interference ability.

In prior arts, infrared light is generally used as a carrier for signal transmission. An infrared light source is used to emit infrared light, and an infrared photodetector is used to receive and convert the infrared light into electrical signals to be output.

However, the existing infrared-based optical coupling apparatus has a relatively low upper limit of operating frequency. With faster data transmission required in the industrial Internet, the existing infrared-based optical coupling apparatus hardly meets the demand.

SUMMARY

Embodiments of the present disclosure provide an optical coupling apparatus with a higher upper limit of operating frequency, which may better meet user's requirement on high-speed data transmission, and provide a photoelectric conversion function more effectively.

In an embodiment, an optical coupling apparatus is provided, including: a monochromatic light source, configured to emit monochromatic light; a monochromatic light photodetector, configured to receive the monochromatic light; and a monochromatic light transmission medium, wherein at least a portion of the monochromatic light transmission medium is disposed between the monochromatic light source and the monochromatic light photodetector, and the monochromatic light is transmitted to the monochromatic light photodetector via the monochromatic light transmission medium, wherein a wavelength of the monochromatic light is shorter than a wavelength of infrared light.

Optionally, the monochromatic light is blue light, and the monochromatic light source is a blue light source.

Optionally, the monochromatic light photodetector is selected from a group consisting of a gallium nitride based blue light photodetector, a silicon carbide based blue light photodetector and a gallium aluminum nitride based blue light photodetector.

Optionally, transmittance of the monochromatic light in the monochromatic light transmission medium is greater than or equal to a predetermined transmittance threshold, wherein at least one light path from a light emitting surface of the monochromatic light source to a receiving surface of the monochromatic light photodetector is completely located in the monochromatic light transmission medium.

Optionally, a permittivity of the monochromatic light transmission medium is greater than or equal to a first predetermined permittivity threshold.

Optionally, the greater the ratio of a length to a diameter of the monochromatic light transmission medium, the smaller the first predetermined permittivity threshold allowed.

Optionally, the optical coupling apparatus further includes: a reflective material surrounding at least a portion of an outer surface of the monochromatic light transmission medium, wherein a reflection coefficient of the reflective material to the monochromatic light is greater than a predetermined reflection coefficient threshold.

Optionally, the optical coupling apparatus further includes: a light source base having a concave portion, wherein a size of an opening of the concave portion is larger than a size of the bottom of the concave portion, wherein the monochromatic light source is arranged at the bottom of the concave portion, and a light emitting surface of the monochromatic light source faces the opening of the concave portion.

Optionally, an inner surface of the concave portion includes a metal reflective material.

Optionally, the monochromatic light source is a monochromatic Light Emitting Diode (LED) or a monochromatic Laser Diode (LD).

Optionally, the monochromatic light is ultraviolet light and the monochromatic light source is an ultraviolet light source, or, the monochromatic light is purple light, and the monochromatic light source is a purple light source.

Optionally, if the monochromatic light is ultraviolet light, the monochromatic light photodetector is selected from a group consisting of a gallium nitride based ultraviolet photodetector, a silicon carbide based ultraviolet photodetector and a gallium aluminum nitride based ultraviolet photodetector; or if the monochromatic light is purple light, the monochromatic light photodetector is selected from a group consisting of a gallium nitride based purple light photodetector, a silicon carbide based purple light photodetector and a gallium aluminum nitride based purple light photodetector.

Optionally, the monochromatic light photodetector is a quantum dot monochromatic light photodetector configured to receive the monochromatic light.

Embodiments of the present disclosure may provide following advantages.

In embodiments of the present disclosure, the monochromatic light source, the monochromatic light photodetector and the monochromatic light transmission medium are configured, and the wavelength of the monochromatic light is set to be shorter than the wavelength of infrared light. As the shorter the wavelength, the greater the photon energy, the monochromatic light can cross a material bandgap barrier of the monochromatic light photodetector more easily than infrared light. The monochromatic light photodetector possibly has a higher upper limit of operating frequency, thereby better meeting user requirements.

Further, the monochromatic light is set as blue light, and the monochromatic light source is set as a blue light source. The blue light photodetector may be made of a semiconductor material whose bandgap width is adapted to a wavelength of the blue light, so as to effectively realize photoelectric conversion and improve conversion sensitivity.

Further, the monochromatic light photodetector may be selected from the group consisting of a gallium nitride based blue light photodetector, a silicon carbide based blue light photodetector and a gallium aluminum nitride based blue light photodetector. As the semiconductor material, such as gallium nitride based, silicon carbide based or gallium aluminum nitride based, generally has a bandgap width which is adapted to the wavelength of the blue light, and has a high electron saturation drift velocity and high electron mobility, shorter delay time and higher operating frequency may be realized. Compared with other blue light based photodetectors, the gallium nitride based blue light photodetector, the silicon carbide based blue light photodetector and the gallium nitride aluminum based blue light photodetector have more mature manufacturing processes and higher quality, thereby better meeting user requirements.

Further, the transmittance of the monochromatic light in the monochromatic light transmission medium is set to be greater than or equal to a predetermined transmittance threshold, and at least one light path from the light emitting surface of the monochromatic light source to the receiving surface of the monochromatic light photodetector is completely located in the monochromatic light transmission medium, so as to provide effective transmission of the monochromatic light in the monochromatic light transmission medium, and make the light of at least one light path received by the monochromatic light photodetector be completely transmitted via the monochromatic light transmission medium, thereby realizing the optical coupling apparatus based on the monochromatic light.

Further, the permittivity of the monochromatic light transmission medium is set to be greater than or equal to the first predetermined permittivity threshold, to realize an electrical insulation function during transmission of the monochromatic light, which more effectively enables a voltage withstand function of the optical coupling apparatus.

Further, the larger the ratio of the length to the diameter of the monochromatic light transmission medium, the smaller the first predetermined permittivity threshold allowed. Therefore, when the optical coupling apparatus is used in a great length application such as an optical fiber system, the characteristic of the thinner and longer the medium, the better the insulation may reduce requirements for insulativity of the specific medium. That is, when the optical coupling apparatus is applied to the optical fiber system, an appropriate material can be selected from more materials as the monochromatic light transmission medium, which helps to reduce production cost and research and development complexity.

Further, by arranging the reflective material to surround at least a portion of the outer surface of the monochromatic light transmission medium, the light that is not directly sent to the monochromatic light photodetector from the monochromatic light source can be transmitted to the monochromatic light photodetector in a reflective manner. Further, by setting the reflective material to have a large reflection coefficient to the monochromatic light, loss of light intensity may be effectively avoided and light transmission efficiency may be improved.

Further, the light source base is provided with the concave portion, and the size of the opening of the concave portion is larger than the size of the bottom of the concave portion, so that a light emitting direction of the monochromatic light may be concentrated, which may enhance effective light intensity of the monochromatic light reaching the monochromatic light photodetector, and improve a current transfer ratio and its central tendency of a product.

Further, the monochromatic light source is a monochromatic LED which serves as a cold light source and possesses relatively high photoelectric conversion efficiency, thereby improving quality of the optical coupling apparatus.

Further, the monochromatic light source is a monochromatic LD which serves as a laser and possesses better directivity, thereby reducing effective light intensity loss caused by light divergence, and improving light intensity of the monochromatic light reaching the monochromatic light photodetector and quality of the optical coupling apparatus.

Further, the monochromatic light has a shorter wavelength and larger photon energy than infrared light. As the quantum dot monochromatic light photodetector is manufactured based on optical transition of electrons in quantum dots, for light that has larger photon energy and is easier to cross a bandgap barrier, a smaller size and a thinner light absorbing layer of quantum dots are configured for the light with a shorter wavelength in the quantum dot monochromatic light photodetector, so as to reduce a delay time and provide higher upper limit of operating frequency, i.e., to enable the optical coupling apparatus based on the quantum dot monochromatic light photodetector to have a higher upper limit of operating frequency.

DETAILED DESCRIPTION OF THE INVENTION

As described in the background, the existing optical coupling apparatus is generally consisting of three parts including a light source for emitting light, a light transmission medium, a light receiving and signal amplifying component. In prior arts, infrared light is generally used as a carrier for signal transmission. An infrared light source is used to emit infrared light, and an infrared photodetector is used to receive and convert the infrared light into electrical signals to be output. However, the existing infrared-based optical coupling apparatus hardly meets practical demands.

Inventors have discovered through research that, in the prior arts, infrared-based optical coupling apparatuses are limited by conditions such as materials and processes, and have an upper limit of operating frequency of 50 MHz which is relatively lower. As more rapid data transmission is required in the industrial Internet, there is an urgent need for an optical coupling apparatus that has a higher upper limit of operating frequency to meet user requirements.

The inventors have also discovered through research that infrared light has longer wavelength and smaller photon energy compared to visible light and ultraviolet light. A photodetector responding to the infrared light needs to be made of semiconductor materials with a narrow bandgap to enable the infrared light to cross a bandgap barrier, thus, available semiconductor materials are limited. However, photodetectors made of the semiconductor materials with a narrow bandgap (such as indium gallium arsenide or lead sulfide) generally have a long response time and a low upper limit of operating frequency, which cannot meet the demands.

In embodiments of the present disclosure, the monochromatic light source, the monochromatic light photodetector and the monochromatic light transmission medium are configured, and the wavelength of the monochromatic light is set to be shorter than the wavelength of infrared light. As the shorter the wavelength, the greater the photon energy, the monochromatic light crosses a bandgap barrier more easily than infrared light. The monochromatic light photodetector may be made of a semiconductor material with a shorter delay time, and thus possibly has a higher upper limit of operating frequency, thereby better meeting user requirements.

In order to clarify the object, solutions and advantages of embodiments of the present disclosure, embodiments of present disclosure will be described explicitly in detail in conjunction with accompanying drawings.

Figure 1:
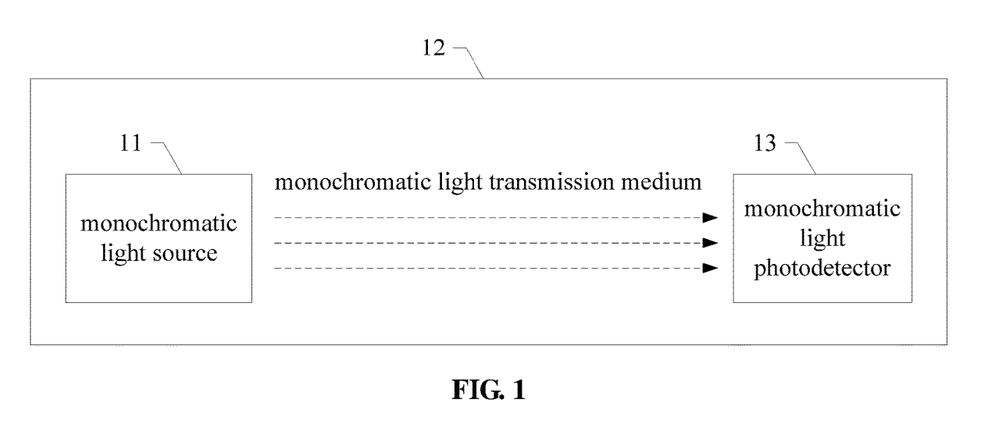
FIG. 1 schematically illustrates a structural diagram of an optical coupling apparatus according to an embodiment.

FIG. 1 schematically illustrates a structural diagram of an optical coupling apparatus according to an embodiment. The optical coupling apparatus includes a monochromatic light source 11, a monochromatic light photodetector 13 and a monochromatic light transmission medium 12.

The monochromatic light source 11 is configured to emit monochromatic light. The monochromatic light photodetector 13 is configured to receive the monochromatic light. At least a portion of the monochromatic light transmission medium 12 is disposed between the monochromatic light source 11 and the monochromatic light photodetector 13, and the monochromatic light is transmitted to the monochromatic light photodetector 13 via the monochromatic light transmission medium 12.

A wavelength of the monochromatic light is shorter than a wavelength of infrared light. The monochromatic light may be visible light, such as red light, orange light, yellow light, green light, cyan light, blue light, purple light or other appropriate light such as ultraviolet light.

It should be noted that for different kinds of monochromatic light, it is necessary to configure their respective monochromatic light sources (for example, a blue light source for blue light) and monochromatic light photodetectors (for example, a blue light photodetector for blue light), that is, types of the monochromatic light source, the monochromatic light transmission medium, and the monochromatic light photodetector should match a wavelength of the corresponding light.

In some embodiments, the monochromatic light source 11 may be a monochromatic LED or LD.

In some embodiments, the monochromatic light may be blue light, and the monochromatic LED may be a blue LED with a third-generation wide bandgap semiconductor material which may be gallium nitride based, silicon carbide based or gallium aluminum nitride based. The above-mentioned blue LED has a higher operating frequency, thereby further improving operating frequency of the optical coupling apparatus.

In some embodiments, the monochromatic light may be blue light, and the monochromatic light source may be a blue LD with a third-generation wide bandgap semiconductor material which may be gallium nitride based, silicon carbide based or gallium aluminum nitride based. The blue LD has better frequency characteristics, thereby further improving operating frequency of the optical coupling apparatus. In the embodiments, the monochromatic light source 11 is a monochromatic LED which serves as a cold light source and possesses relatively high photoelectric conversion efficiency or a monochromatic LD which possesses better directivity, so as to improve quality of the optical coupling apparatus.

The monochromatic light photodetector 13 is configured to receive the monochromatic light and convert it into electrical signals.

The inventors have also discovered through further research that the wavelength of the light emitted by the monochromatic light source should be adapted to the width of the bandgap of the semiconductor material used in the monochromatic light photodetector. Specifically, in some embodiments, the wavelength of the monochromatic light is shorter than the wavelength of infrared light. Accordingly, the width of the bandgap of the semiconductor material used in the monochromatic light photodetector should be adapted to the wavelength of the monochromatic light, that is, the semiconductor material used in the monochromatic light photodetector should respond to the monochromatic light with the wavelength shorter than the wavelength of the infrared light, so that the monochromatic light photodetector can cooperate with the monochromatic light with the wavelength. Besides, the photodetector is made of an appropriate semiconductor material having a high electron saturation drift velocity and high electron mobility, so as to enable the optical coupling apparatus to have a shorter delay time and a higher upper limit of operating frequency.

In some embodiments, the monochromatic light is blue light, and the monochromatic light source is a blue light source. A semiconductor material which has a bandgap width adapted to the wavelength of the blue light, and has a high electron saturation drift velocity and high electron mobility is adopted to form the monochromatic light photodetector, so as to realize a photoelectric conversion and enable the optical coupling apparatus to have a shorter delay time and a higher upper limit of operating frequency.

In some embodiments, the monochromatic light is blue light, and the monochromatic light photodetector 13 may be selected from a group consisting of a gallium nitride (GaN) based blue light photodetector, a silicon carbide (SiC) based blue light photodetector and a gallium aluminum nitride (AlGaN) based blue light photodetector.

In the above embodiments, the monochromatic light is blue light, and accordingly an appropriate monochromatic light photodetector may be selected among various monochromatic light photodetectors. The monochromatic light photodetector having a high operating frequency is conducive to increasing the operating frequency of the optical coupling apparatus. Specifically, the monochromatic light photodetector may be selected from the group consisting of a gallium nitride based blue light photodetector, a silicon carbide based blue light photodetector and a gallium aluminum nitride based blue light photodetector. As the semiconductor material, such as gallium nitride based, silicon carbide based or gallium aluminum nitride based, generally has a bandgap width which is adapted to the wavelength of the blue light, and has a high electron saturation drift velocity and high electron mobility, shorter delay time and higher operating frequency may be realized. Compared with other blue light based photodetectors, the gallium nitride based blue light photodetector, the silicon carbide based blue light photodetector and the gallium nitride aluminum based blue light photodetector have more mature manufacturing processes and higher quality, thereby better meeting user requirements.

In some embodiments, the monochromatic light may be ultraviolet light and the monochromatic light source 11 is an ultraviolet light source, or, the monochromatic light is purple light, and the monochromatic light source 11 is a purple light source.

In some embodiments, if the monochromatic light is ultraviolet light, the monochromatic light photodetector 13 may be selected from a group consisting of a gallium nitride based ultraviolet photodetector, a silicon carbide based ultraviolet photodetector and a gallium aluminum nitride based ultraviolet photodetector; or, if the monochromatic light is purple light, the monochromatic light photodetector 13 may be selected from a group consisting of a gallium nitride based purple light photodetector, a silicon carbide based purple light photodetector and a gallium aluminum nitride based purple light photodetector.

In the above embodiments, the monochromatic light is ultraviolet light or purple light, and accordingly an appropriate monochromatic light photodetector may be selected among various monochromatic light photodetectors. The monochromatic light photodetector having a high operating frequency is conducive to increasing the operating frequency of the optical coupling apparatus. Specifically, the monochromatic light photodetector may be selected from the group consisting of a gallium nitride based ultraviolet light photodetector, a silicon carbide based ultraviolet light photodetector and a gallium aluminum nitride based ultraviolet light photodetector. The semiconductor material, such as gallium nitride based, silicon carbide based or gallium aluminum nitride based, having a bandgap width adapted to the wavelength of the ultraviolet light or the purple light and having a high electron saturation drift velocity and high electron mobility may be adopted for forming the monochromatic light photodetector, thus, shorter delay time and higher operating frequency may be realized. Compared with other ultraviolet light based photodetectors, the gallium nitride based ultraviolet light photodetector, the silicon carbide based ultraviolet light photodetector and the gallium nitride aluminum based ultraviolet light photodetector have more mature manufacturing processes and higher quality, thereby better meeting user requirements. Similarly, compared with other purple light based photodetectors, the gallium nitride based purple light photodetector, the silicon carbide based purple light photodetector and the gallium nitride aluminum based purple light photodetector have more mature manufacturing processes and higher quality, thereby better meeting user requirements.

In some embodiments, the monochromatic light photodetector 13 is a quantum dot monochromatic light photodetector configured to receive the monochromatic visible light.

In some embodiments, the quantum dot monochromatic light photodetector may be a CdSe/ZnS quantum dot monochromatic light photodetector, or a quantum dot monochromatic light photodetector of other appropriate materials based on the cadmium (Cd)-free system.

In some embodiments, the quantum dot blue light photodetector based on the blue light source may be a CdSe/ZnS quantum dot blue light photodetector, or a quantum dot blue light photodetector of other appropriate materials based on the Cd-free system. The quantum dot purple light photodetector based on the purple light source may be a CdSe/ZnS quantum dot purple light photodetector, or a quantum dot purple light photodetector of other appropriate materials based on the Cd-free system.

It could be understood that the quantum dot monochromatic light photodetector should be adapted to the selected monochromatic light. For example, if the monochromatic light is red light, the quantum dot monochromatic light photodetector should be a quantum dot red light photodetector.

In the above embodiments, the monochromatic light has a shorter wavelength and larger photon energy compared with infrared light. As the quantum dot monochromatic light photodetector is manufactured based on optical transition of electrons in quantum dots, for light that has larger photon energy and is easier to cross a bandgap barrier, a smaller size and a thinner light absorbing layer of quantum dots are configured for the light with a shorter wavelength in the quantum dot monochromatic light photodetector, so as to reduce a delay time and provide higher upper limit of operating frequency, i.e., to enable the optical coupling apparatus based on the quantum dot monochromatic light photodetector to have a higher upper limit of operating frequency.

In some embodiments, the monochromatic light transmission medium 12 refers to a substance that contributes to transmission of the light, for example, it may be a physical transmission material or a vacuum, and may include appropriate gases such as air.

In some embodiments, the monochromatic light transmission medium 12 may be transparent to the monochromatic light.

In some embodiments, transmittance of the monochromatic light in the monochromatic light transmission medium 12 is greater than or equal to a predetermined transmittance threshold, wherein at least one light path from a light emitting surface of the monochromatic light source 11 to a receiving surface of the monochromatic light photodetector 13 is completely located in the monochromatic light transmission medium 12.

In some embodiments, different predetermined transmittance thresholds may be set for different kinds of monochromatic light to make the monochromatic light transmission medium 12 match the wavelength of the monochromatic light, thereby enhancing effective light intensity, improving signal energy transmission efficiency, reducing a delay time of signal transmission and providing higher operating frequency.

In the above embodiments, the transmittance of the monochromatic light in the monochromatic light transmission medium 12 is set to be greater than or equal to the predetermined transmittance threshold, and at least one light path from the light emitting surface of the monochromatic light source 11 to the receiving surface of the monochromatic light photodetector is completely located in the monochromatic light transmission medium 12, so as to provide effective transmission of the monochromatic light in the monochromatic light transmission medium 12, and make the light of at least one light path received by the monochromatic light photodetector 13 be completely transmitted via the monochromatic light transmission medium 12, thereby realizing the optical coupling apparatus based on the monochromatic light.

Referring to FIG. 1, the monochromatic light transmission medium 12 wraps the monochromatic light source 11 and the monochromatic light photodetector 13, that is, multiple light paths from the light emitting surface of the monochromatic light source 11 to the receiving surface of the monochromatic light photodetector 13 is completely located in the monochromatic light transmission medium 12.

Light paths from the monochromatic light source 11 to the monochromatic light photodetector 13 which are completely located in the monochromatic light transmission medium 12 are illustrated with dashed lines in FIG. 1.

Figure 2:
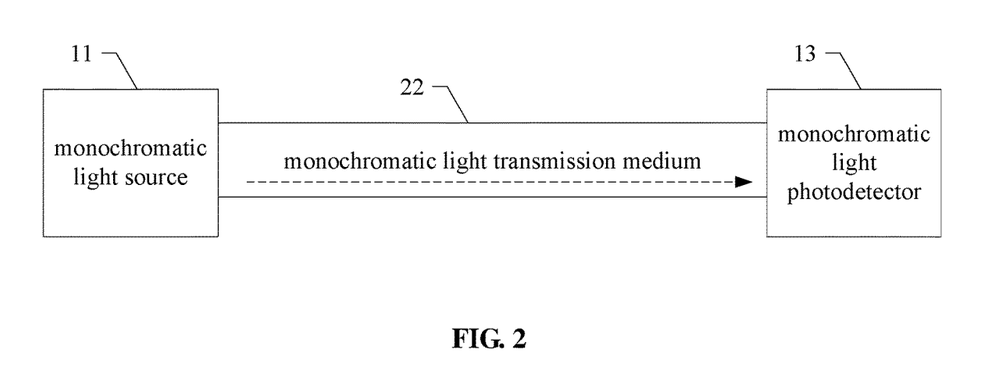
FIG. 2 schematically illustrates a structural diagram of an optical coupling apparatus according to an embodiment.

Referring to FIG. 2, FIG. 2 schematically illustrates a structural diagram of an optical coupling apparatus according to an embodiment.

The monochromatic light transmission medium 22 fills a portion of space between the monochromatic light source 11 and the monochromatic light photodetector 13. A dashed line in FIG. 2 refers to a light path from the monochromatic light source 11 to the monochromatic light photodetector 13 which is completely located in the monochromatic light transmission medium 22.

It could be understood that the monochromatic light transmission medium 22 as shown in FIG. 2 can wrap at least one light emitting surface of the monochromatic light source 11 and the receiving surface of the monochromatic light photodetector 13, wherein the light emitting surface and the receiving surface have a one-to-one correspondence, so as to make the light path from the light emitting surface of the monochromatic light source 11 to the receiving surface of the monochromatic light photodetector 13 be completely located in the monochromatic light transmission medium 22.

In some embodiments, a permittivity of the monochromatic light transmission medium 12 (22) as shown in FIGS. 1 and 2 may be greater than or equal to a first predetermined permittivity threshold.

In the above embodiments, the permittivity of the monochromatic light transmission medium 12 (22) is set to be greater than or equal to the first predetermined permittivity threshold, to realize an electrical insulation function during transmission of the monochromatic light, which more effectively enables a voltage withstand function of the optical coupling apparatus.

In some embodiments, the larger the ratio of a length to a diameter of the monochromatic light transmission medium 12 (22) as shown in FIGS. 1 and 2, the smaller the first predetermined permittivity threshold allowed.

In the above embodiments, the larger the ratio of the length to the diameter of the monochromatic light transmission medium 12 (22), the smaller the first predetermined permittivity threshold allowed. Therefore, when the optical coupling apparatus is used in a great length application such as an optical fiber system, the characteristic of the thinner and longer the medium, the better the insulation may reduce requirements for insulativity of the specific medium. That is, when the optical coupling apparatus is applied to the optical fiber system, an appropriate material can be selected from more materials as the monochromatic light transmission medium 12 (22), which helps to reduce production cost and research and development complexity.

Further, in an embodiment, a dielectric optical fiber system is provided. The dielectric optical fiber system is formed based on the optical coupling apparatus provided in the above embodiments, wherein a length of the monochromatic light transmission medium is greater than or equal to a predetermined length.

In some embodiments, the predetermined length may be set to 10 meters.

In some embodiments, the optical coupling apparatus may have a relatively small length, for example, 0.1 mm to 1 mm, and may be used to manufacture an optical coupler. In some embodiments, the optical coupling apparatus may have a medium length, for example, 1 mm to 10 meters. In some embodiments, the optical coupling apparatus may have a relatively great length, for example, 10 meters to 1000 meters, and may be used in an optical fiber system, such as a plastic optical fiber system. Compared with prior arts that the Ethernet based on copper cables generally has an effective distance of 100 meters, the plastic optical fiber system provided in the embodiments of the present disclosure is conducive to realizing a high-speed, large-capacity and long-distance industrial Internet. The plastic optical fiber system also helps to realize a "fiber to the home" high-speed data transmission line of the last 1 kilometer after an ordinary glass optical fiber, which reduces cost compared with a glass optical fiber system. "Fiber to the home" can provide users with extremely large bandwidths, and thus it has always been considered as an ideal access method, is essential for realizing the information society, and may require large-scale installation. The number of optical fibers required for "fiber to the home" may be 2 to 3 times that of existing laid optical fibers, thus, it is necessary and meaningful to adopt the low-cost plastic optical fiber system.

In some embodiments, the dielectric optical fiber system may use a total internal reflection photonic crystal fiber with a wide single-mode wavelength range which is at least from 457.9 to 1550 nm. A core of the dielectric optical fiber system may include a highly transparent polymer such as Polystyrene (PS) or Polymethyl Methacrylate (PMMA), and a cladding layer of the dielectric optical fiber system may include PMMA or fluoroplastic.

Further, the optical coupling apparatus may further include: a reflective material surrounding at least a portion of an outer surface of the monochromatic light transmission medium, wherein a reflection coefficient of the reflective material to the monochromatic light is greater than a predetermined reflection coefficient threshold.

Referring to FIG. 2, in some embodiments, the reflective material may be arranged to surround the outer surface of the monochromatic light transmission medium.

Figure 3:
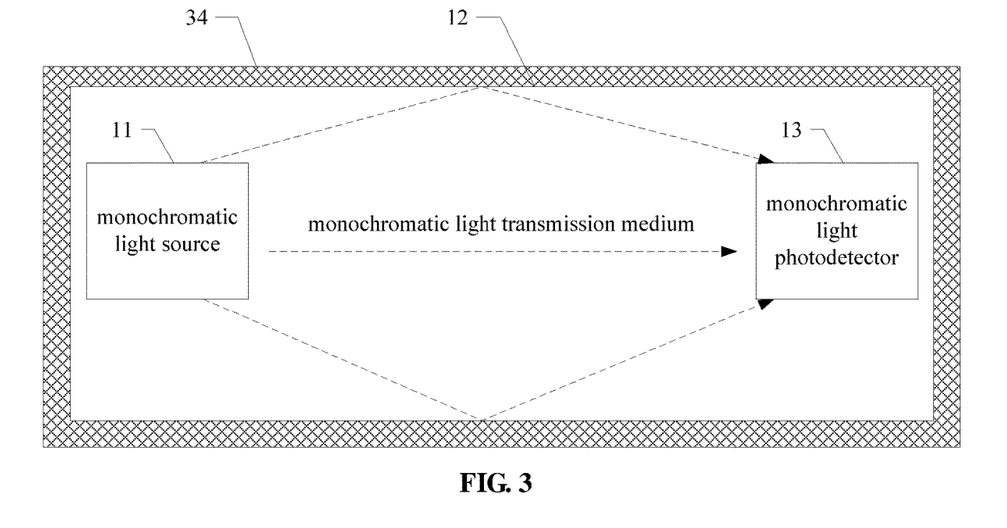
FIG. 3 schematically illustrates a structural diagram of an optical coupling apparatus according to an embodiment.

Referring to FIG. 3, FIG. 3 schematically illustrates a structural diagram of an optical coupling apparatus according to an embodiment. The optical coupling apparatus as shown in FIG. 3 provides further improvement on the optical coupling apparatus as shown in FIG. 1. Differences therebetween are described below.

Referring to FIG. 3, the optical coupling apparatus includes a monochromatic light source 11, a monochromatic light photodetector 13, a monochromatic light transmission medium 12 and a reflective material 34.

The reflective material 34 as shown in FIG. 3 surrounds the monochromatic light source 11, the monochromatic light transmission medium 12 and the monochromatic light photodetector 13, that is, surrounding the whole outer surface of the monochromatic light transmission medium 12.

In some embodiments, the reflective material 34 may further surround a light emitting surface of the monochromatic light source 11, the monochromatic light transmission medium 12 and a receiving surface of the monochromatic light photodetector 13, that is, surrounding a portion of the outer surface of the monochromatic light transmission medium 12.

In some embodiments, the reflective material 34 may be only disposed over and under an area between the monochromatic light source 11 and the monochromatic light photodetector 13 as shown in FIG. 3, to reflect a portion of the light emitted from the monochromatic light source 11.

It should be noted that, in the optical coupling apparatus as shown in FIG. 3, the light emitting surface of the monochromatic light source 11 may be arranged in a direction facing the receiving surface of the monochromatic light photodetector 13, for example, the light emitting surface of the monochromatic light source 11 is arranged on a right surface of the monochromatic light source 11, and the receiving surface of the monochromatic light photodetector 13 is arranged on a left surface of the monochromatic light photodetector 13, so as to realize a light transmission direction as shown in FIG. 1.

Alternatively, in the optical coupling apparatus as shown in FIG. 3, the light emitting surface of the monochromatic light source 11 may be arranged in a direction not facing the receiving surface of the monochromatic light photodetector 13. For example, the light emitting surface of the monochromatic light source 11 is arranged on an upper surface of the monochromatic light source 11, and the receiving surface of the monochromatic light photodetector 13 is also arranged on the upper surface of the monochromatic light photodetector 13. Light is reflected and transmitted in a light transmission direction shown by dashed lines in FIG. 3. It could be understood that this arrangement enables the monochromatic light source 11 and monochromatic light photodetector 13 to be arranged on a same plane and face a same direction, which helps to reduce installation cost of a mounting frame without reducing transmission effect.

In some embodiments, the reflective material 34 may have reflectivity for the monochromatic light and electrical insulation.

In some embodiments, a reflection coefficient of the reflective material 34 to the monochromatic light is greater than a predetermined reflection coefficient threshold. It should be noted that different predetermined reflection coefficient thresholds may be set for different kinds of monochromatic light respectively, so that the reflective material 34 matches a wavelength of the monochromatic light to improve signal energy transmission efficiency and reduce loss of effective light intensity.

Further, a permittivity of the reflective material 34 may be greater than or equal to a second predetermined permittivity threshold.

It should be noted that different second predetermined permittivity thresholds may be set for different kinds of monochromatic light respectively, so that the reflective material 34 matches a wavelength of the monochromatic light to reduce degradation during transmission and induced capacitance generated between an input terminal and an output terminal, that is, to avoid an electrical crosstalk, thereby improving signal energy transmission efficiency and reducing a signal propagation delay time.

In the above embodiments, by arranging the reflective material to surround at least a portion of the outer surface of the monochromatic light transmission medium, the light that is not directly sent to the monochromatic light photodetector from the monochromatic light source can be transmitted to the monochromatic light photodetector in a reflective manner. Further, by setting the reflective material to have a large reflection coefficient to the monochromatic light, energy loss during light transmission may be effectively avoided and quality of the optical coupling apparatus may be improved.

Further, the optical coupling apparatus further includes a light source base having a concave portion, wherein a size of an opening of the concave portion is larger than a size of the bottom of the concave portion, wherein the monochromatic light source is arranged at the bottom of the concave portion, and the light emitting surface of the monochromatic light source faces the opening of the concave portion.

Figure 4:
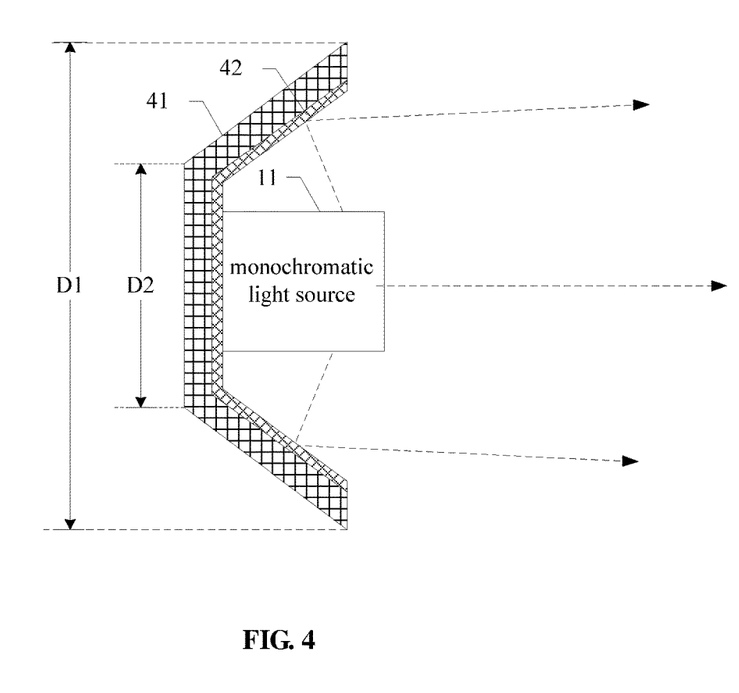
FIG. 4 schematically illustrates a structural diagram of a light source base according to an embodiment.

Referring to FIG. 4, FIG. 4 schematically illustrates a structural diagram of a light source base according to an embodiment. The light source base 41 includes a concave portion, wherein a size D1 of an opening of the concave portion is larger than a size D2 of the bottom of the concave portion, wherein the monochromatic light source 11 is arranged at the bottom of the concave portion, and faces the opening of the concave portion.

Dashed lines in FIG. 4 illustrate light paths when the light source base 41 is used. It can be seen that a light emitting direction is more concentrated.

In some embodiments, an inner surface of the concave portion is formed of a metal reflective material, for example, metal palladium, titanium, aluminum, copper, silver, gold or their compounds, to further improve effective light intensity of the monochromatic light reaching the monochromatic light photodetector and avoid energy loss in light transmission, thereby improving quality of the optical coupling apparatus. For example, in the light source base as shown in FIG. 4, a metal reflective layer 42 is provided on the inner surface of the concave portion.

In the above embodiments, the light source base 41 is provided with the concave portion, and the size of the opening of the concave portion is larger than the size of the bottom of the concave portion, so that the light emitting direction of the monochromatic light may be concentrated, which may enhance effective light intensity of the monochromatic light reaching the monochromatic light photodetector, and improve a current transfer ratio and its central tendency of a product.

A cross section of the concave portion as shown in FIG. 4 is trapezoidal, that is, a cross section shape of a side wall of the concave portion is a straight line. Alternatively, referring to FIG. 5, in some embodiments, the cross section shape of the side wall of the concave portion is a curve.

Figure 5:
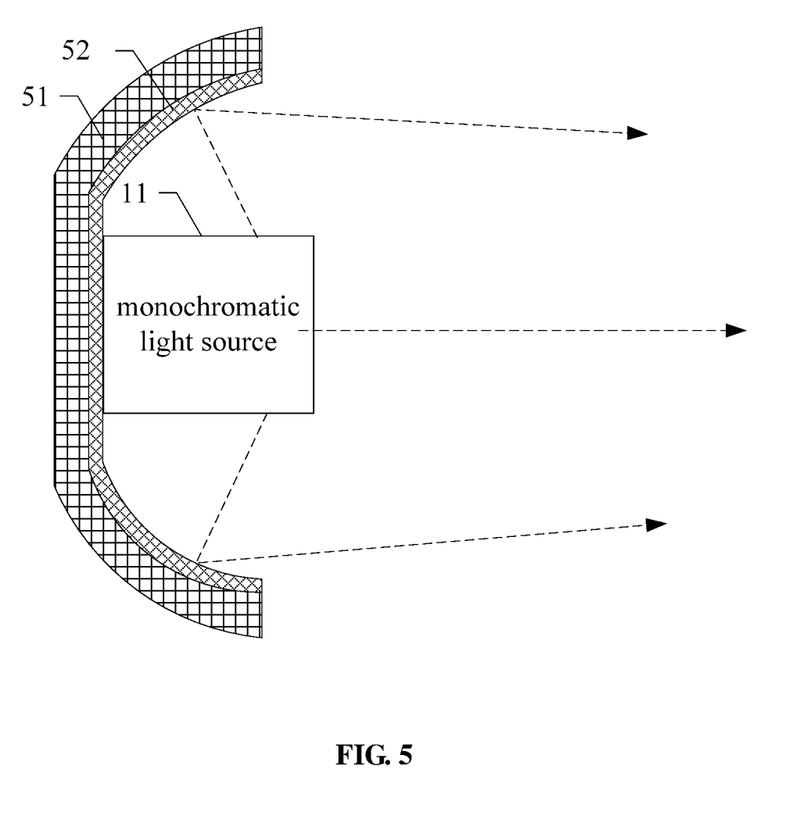
FIG. 5 schematically illustrates a structural diagram of a light source base according to an embodiment.

Referring to FIG. 5, FIG. 5 schematically illustrates a structural diagram of a light source base according to an embodiment. The light source base 51 includes a concave portion, wherein a size of an opening of the concave portion is larger than a size of the bottom of the concave portion, wherein the monochromatic light source 11 is arranged at the bottom of the concave portion, and faces the opening of the concave portion.

Dashed lines in FIG. 5 illustrate light paths when the light source base 51 is used. It can be seen that a light emitting direction is more concentrated.

In some embodiments, an inner surface of the concave portion is formed of a metal reflective material, for example, metal palladium, titanium, aluminum, copper, silver, gold or their compounds, to further improve effective light intensity of the monochromatic light reaching the monochromatic light photodetector and avoid energy loss in light transmission, thereby improving quality of the optical coupling apparatus. For example, in the light source base as shown in FIG. 5, a metal reflective layer 52 is provided on the inner surface of the concave portion.

In the above embodiments, the light source base 51 is provided with the concave portion, and the size of the opening of the concave portion is larger than the size of the bottom of the concave portion, so that the light emitting direction of the monochromatic light may be concentrated, which may enhance effective light intensity of the monochromatic light reaching the monochromatic light photodetector, and improve a current transfer ratio and its central tendency of a product.

Although the present disclosure has been disclosed above with reference to preferred embodiments thereof, it should be understood that the disclosure is presented by way of example merely, and not limitation. Those skilled in the art can modify and vary the embodiments without departing from the spirit and scope of the present disclosure.

What is claimed is:

1. An optical coupling apparatus, comprising:
   a monochromatic light source, configured to emit monochromatic light;
   a monochromatic light photodetector, configured to receive the monochromatic light; and
   a monochromatic light transmission medium, wherein at least a portion of the monochromatic light transmission medium is disposed between the monochromatic light source and the monochromatic light photodetector, and the monochromatic light is transmitted to the monochromatic light photodetector via the monochromatic light transmission medium,
   wherein a wavelength of the monochromatic light is shorter than a wavelength of infrared light, and a permittivity of the monochromatic light transmission medium is greater than or equal to a first predetermined permittivity threshold.

2. The optical coupling apparatus according to claim 1, wherein the monochromatic light is blue light, and the monochromatic light source is a blue light source.

3. The optical coupling apparatus according to claim 2, wherein the monochromatic light photodetector is selected from a group consisting of a gallium nitride based blue light photodetector, a silicon carbide based blue light photodetector and a gallium aluminum nitride based blue light photodetector.

4. The optical coupling apparatus according to claim 1, wherein transmittance of the monochromatic light in the monochromatic light transmission medium is greater than or equal to a predetermined transmittance threshold, wherein at least one light path from a light emitting surface of the monochromatic light source to a receiving surface of the monochromatic light photodetector is completely located in the monochromatic light transmission medium.

5. The optical coupling apparatus according to claim 1, wherein the greater the ratio of a length to a diameter of the monochromatic light transmission medium, the smaller the first predetermined permittivity threshold.

6. The optical coupling apparatus according to claim 1, further comprising:
   a reflective material surrounding at least a portion of an outer surface of the monochromatic light transmission medium,
   wherein a reflection coefficient of the reflective material to the monochromatic light is greater than a predetermined reflection coefficient threshold.

7. The optical coupling apparatus according to claim 1, further comprising:
   a light source base having a concave portion, wherein a size of an opening of the concave portion is larger than a size of the bottom of the concave portion,
   wherein the monochromatic light source is arranged at the bottom of the concave portion, and a light emitting surface of the monochromatic light source faces the opening of the concave portion.

8. The optical coupling apparatus according to claim 7, wherein an inner surface of the concave portion comprises a metal reflective material.

9. The optical coupling apparatus according to claim 1, wherein the monochromatic light source is a monochromatic Light Emitting Diode (LED) or a monochromatic Laser Diode (LD).

10. The optical coupling apparatus according to claim 1, wherein the monochromatic light is ultraviolet light and the monochromatic light source is an ultraviolet light source, or, the monochromatic light is purple light, and the monochromatic light source is a purple light source.

11. The optical coupling apparatus according to claim 10, wherein:
    if the monochromatic light is ultraviolet light, the monochromatic light photodetector is selected from a group consisting of a gallium nitride based ultraviolet photodetector, a silicon carbide based ultraviolet photodetector and a gallium aluminum nitride based ultraviolet photodetector; or
    if the monochromatic light is purple light, the monochromatic light photodetector is selected from a group consisting of a gallium nitride based purple light photodetector, a silicon carbide based purple light photodetector and a gallium aluminum nitride based purple light photodetector.

12. The optical coupling apparatus according to claim 1, wherein the monochromatic light photodetector is a quantum dot monochromatic light photodetector configured to receive the monochromatic light.

* * * * *